April 7, 1931.  C. A. UPSON  1,799,199
AUTOMOBILE WINTER FRONT
Filed Oct. 26, 1927   3 Sheets-Sheet 1

*Fig.1*

INVENTOR
*Charles A. Upson*
BY
*his* ATTORNEYS

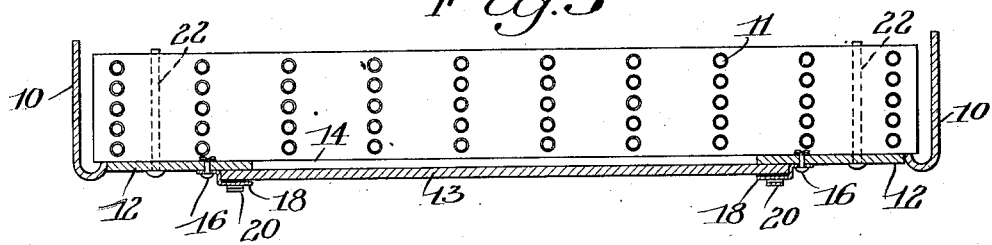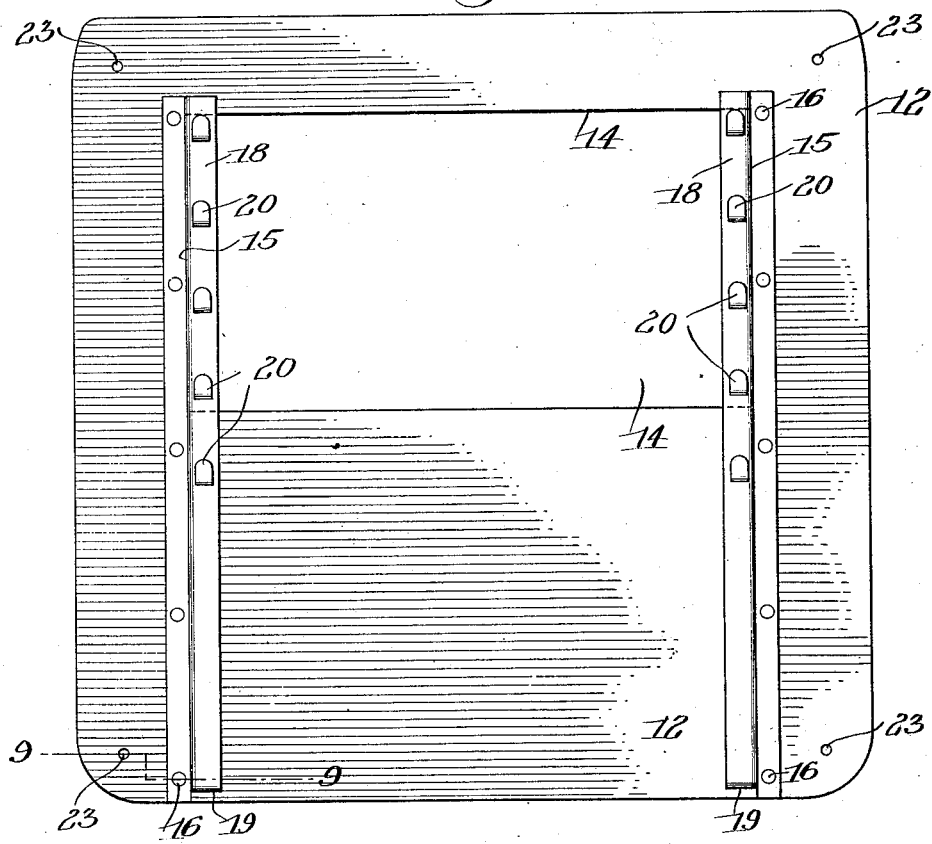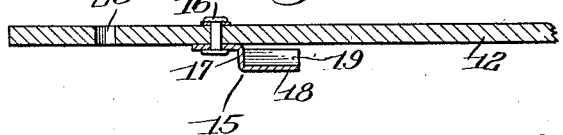

April 7, 1931.    C. A. UPSON    1,799,199
AUTOMOBILE WINTER FRONT
Filed Oct. 26, 1927    3 Sheets-Sheet 3
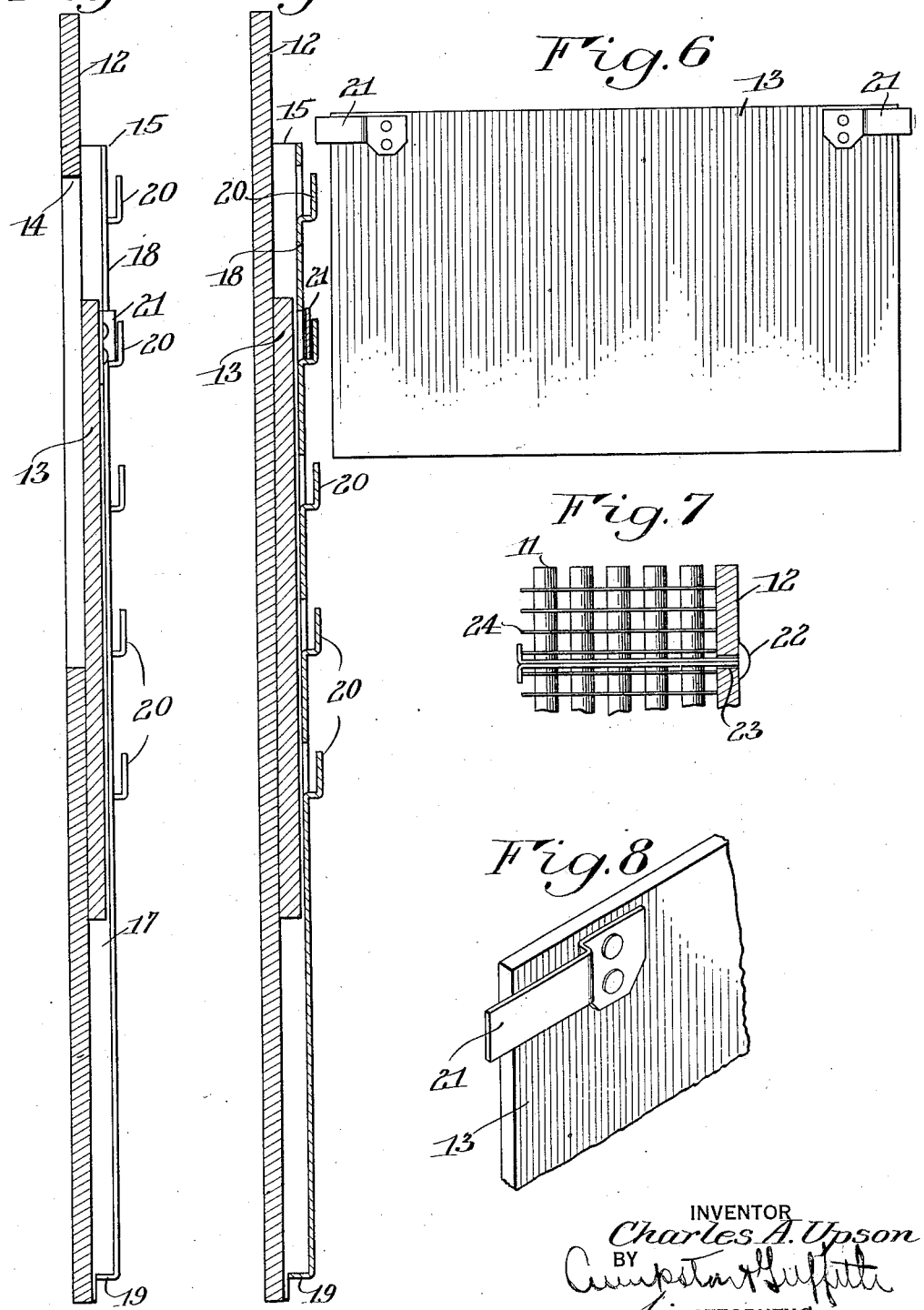
INVENTOR
Charles A. Upson
BY
his ATTORNEYS Patented Apr. 7, 1931

1,799,199

UNITED STATES PATENT OFFICE

CHARLES A. UPSON, OF LOCKPORT, NEW YORK

AUTOMOBILE WINTER FRONT

Application filed October 26, 1927. Serial No. 228,879.

This invention relates to winter fronts for automobile radiators, and more particularly to devices of this character which are provided with means for regulating the supply of air passing through the radiator, an object of the invention being to provide a simple and efficient device of this nature of a rugged and durable form, economical to manufacture and easy to install and operate.

Another object is the provision of a device of this nature having simple and effective shutter mechanism, with an efficient and easy means for adjusting the shutter to increase or diminish the amount of air passing through the radiator.

A further object is to provide a device of the class described having effective means for easily and quickly securing it in place on a radiator.

Still a further object is the provision of a neat and sightly device of this nature having relatively few parts, which will not detract from the appearance of the automobile, on which it is installed, and which will at all times serve the purpose intended without likelihood of getting out of order.

To these and other ends the invention resides in certain improvements and combinations of parts, all as will be hereinafter more fully described, the novel features being pointed out in the claims at the end of the specification.

In the drawings:

Figure 1 is a front elevation of the winter front applied to the radiator of an automobile showing the shutter in an adjusted position;

Figure 2 is a similar view of the device apart from the radiator and with the shutter removed therefrom;

Figure 3 is a horizontal sectional view of the device taken on line 3—3 of Fig. 1;

Figure 4 is a vertical section taken on the line 4—4 of Figure 1 looking in the direction of the arrows;

Figure 5 is a vertical section taken on the line 5—5 of Figure 1 looking in the direction of the arrows;

Figure 6 is a detail view of the shutter;

Figure 7 is a detail section showing the manner of securing the device on to the radiator;

Figure 8 is a fragmentary detail in perspective of the shutter with one of its supporting clips, and Figure 9 is a section taken on line 9—9 of Figure 2.

Similar reference numerals throughout the several views indicate the same parts.

The present embodiment of the invention provides a device which may be installed on an automobile radiator with a minimum amount of time and effort and which will serve very effectively during cold weather in maintaining the radiator at the proper temperature while the engine is running and preventing freezing when the engine is not running. To this end the invention is embodied in an outer portion having an opening therein and a movable shutter portion for varying the size of the opening to regulate the flow of air passing through the radiator.

Referring more particularly to the drawings there is shown at 10 a radiator shell having a core 11 to which an outer portion or body plate 12 of a winter front is adapted to be secured. The body plate 12 is provided with a shutter 13 which is movably mounted for adjustment to various positions with respect thereto. The body plate and the shutter are preferably formed from fibre board although any other more or less rigid sheet material could be utilized for this purpose.

The outer portion or body plate 12 of the present embodiment of the invention is shaped to fit substantially within the inner periphery of the radiator shell 10 so as to substantially prevent the entrance of air to the radiator core around the edges thereof. An opening 14 is formed centrally of the body plate for the purpose of exposing a certain portion of the radiator core for the passage of air therethrough. This opening may assume various sizes or shapes according to the requirements of particular radiators, but in the present instance for the purposes of illustration the opening 14 is shown as of rectangular shape.

The shutter 13 is shaped to conform to the shape of the opening 14, but is preferably somewhat wider and longer than the opening so as to effectively prevent the passage of air therethrough when the shutter is in place thereover.

Means are provided for movably holding the shutter to the body plate and for securing it in selected positions relative to the opening 14. In the present instance, the shutter is movably held to the body plate by guiding means in the form of sheet metal guide strips 15 suitably secured to the body plate 12, as for example, by means of rivets 16. The guide strips 15 are bent to provide an outwardly projecting portion 17 and a laterally projecting portion 18 which fit around and effectively house the side edges of the shutter, as shown in Figure 3. In order to prevent the shutter from slipping out of the guide strips 15, the lower end of the portion 18 of each guide strip is bent inwardly at 19, see Fig. 9. In this way an effective stop means is provided and at the same time the parts are given a rounded off and finished appearance.

The means for securing the shutter in various adjusted positions comprises, in the present embodiment, a plurality of hook portions 20 struck out from the laterally projecting edges 18 of the guides and cooperating with laterally projecting spring clips or ears 21 riveted or otherwise suitably secured to the shutter 13. It is desirable in practice that the clips 21 have sufficient resiliency so as to snugly engage the portion 18 yet allowing for the ready passage of the clip over the hooks 20 when it is desired to change the position of the shutter, for this purpose the clips 21 are formed from any suitable spring metal having the proper amount of resiliency for this purpose. The hooks 20 are formed so as to snugly engage the clips 21 between them and the surface of part 18 so as to prevent possible rattling of the parts.

The means for securing the winter front in place comprises in the present instance, a plurality of relatively long split pins 22 (see Figs. 3 and 7) which are inserted in openings 23 in the body plate 12 and extend through the radiator core and have their ends bent outwardly to engage the edge of the radiator fins 24. Obviously other suitable fastening means could be utilized for this purpose. The device can thus be quickly installed in place on a radiator by merely inserting the pins 22 in the openings 23 after which the ends of the pins are bent in the manner indicated.

After the device is installed on the radiator, if the operator desires to change the adjustment of the shutter, he grasps the clips 21 and lifts the shutter from engagement with the hooks 20 after which the shutter is moved upwardly or downwardly along guides 15 depending on the conditions which it is desired to meet. In either case the operator springs the clips outwardly a slight amount to permit them to pass the hooks 20 and reengages the clips in another set of hooks. If it is desired to entirely uncover the opening 14, the shutter may be lowered until it comes into engagement with the inturned ends 19 of the guides 15.

The invention thus provides an effective and inexpensive winter front for automobiles which can be manufactured at extremely small cost due to the fact that certain parts of the device can be constructed from relatively small pieces of wall board or other sheet material which might otherwise be wasted in plants where such sheet material is made. The shutter 13 and body plate 12 each offers a relatively smooth unbroken surface of sufficient area for the effective display of advertisements of a general nature thereon, and by reason of the small cost of manufacture it will be feasible to distribute the devices gratis or for a very nominal charge, by reason of their advertising value which of itself will often more than offset the cost of the device.

The invention has the further advantages of lightness, simplicity and ease of installation; it can be made so as to present a pleasing effect to the eye, and at the same time affording ready means for adjustment which is rugged and durable and not likely to get out of order even on automobiles in which the vibration of the parts is pronounced.

I claim as my invention:

1. In a winter front for radiators, a body plate having an opening therein, a shutter for said opening, guiding means on said body plate for holding said shutter slidably thereon, and cooperating means on said shutter and said guiding means located in front of the body plate for securing the shutter in various adjusted positions along said opening.

2. In a winter front for radiators, a body plate member having an opening therein, a shutter member for said opening, guiding means on one of said members and cooperable with the other of said members for holding said shutter member slidably on said body plate member, and cooperating means located in front of the body plate and associated with said guiding means and one of said members for securing said shutter member in various adjusted positions along said opening.

3. In a winter front for radiators, a body plate having an opening therein, a shutter for said opening overlapping the edges of said body plate at opposite sides of said opening, guiding means for holding said shutter slidably on said body plate, and yieldable means for securing said shutter in various adjusted positions along said openings whereby to hold the shutter against rattling.

4. In a winter front for radiators, a body plate having an opening cut therein, a shutter for said opening of greater length than the opening and overlapping the edges of said body plate at opposite sides of said opening, guiding means for holding said shutter slidably thereon, said guiding means comprising a member secured to and extending forwardly of said body plate and having a front portion overlying the edge of said shutter in advance thereof, a plurality of spaced engaging members on said front portion extending forwardly thereof, and laterally projecting members on said shutter overlying said guiding means and adapted to be supported by said engaging members for holding said shutter in various adjusted positions along said opening.

5. In a winter front for radiators, a body plate having an opening therein, a shutter member for said opening slidably mounted upon the body plate, guide strips on the body plate for the shutter member, said guide strips each having forwardly projecting portions thereon spaced from the body of the strip and supporting members for the shutter member arranged to extend in front of the strips and behind said forwardly projecting portions whereby to support the shutter in different positions of adjustment.

6. In a winter front for radiators, a body plate having an opening therein, a shutter plate member slidably mounted upon the body plate, guide members for the shutter plate member secured upon the body plate member and cooperating parts upon the guide members and shutter plate member for supporting the latter in different positions of adjustment with respect to the opening, certain of said parts being of spring material whereby to cooperate with the parts engaging the same to hold the shutter plate member against rattling 7. In a winter front for radiators, a body plate having an opening therein, a shutter plate slidably mounted on the body plate, devices upon the body plate for guiding and supporting the shutter plate and spring clips upon the shutter plate adapted to yieldingly engage parts of said devices for supporting and holding the body plate against rattling.

8. In a winter front for radiators, a body plate having an opening therein, a shutter plate slidably mounted upon the body plate to different positions of adjustment with respect to the opening, strips upon the body plate for guiding the shutter plate behind which the edges of the latter are disposed, a plurality of tongue-like portions projecting forwardly from each of said strips and clip-like members upon the shutter plate having portions overlying the strips and adapted to engage behind said tongue-like portions to support the shutter plate in adjusted position.

9. In a winter front for radiators, a body plate having an opening therein, a shutter for said opening lying in front of said plate and overlapping the edges thereof at opposite sides of said opening and arranged for sliding engagement with the front face of the plate, guiding members secured to the front face of the body plate and having portions disposed forwardly thereof and engaging the front face of the shutter for supporting and guiding said shutter and cooperating devices on said shutter and guiding members for securing the shutter in various adjusted positions along said opening.

10. In a winter front for radiators, a body plate having an opening therein, a shutter for said opening lying in front of said plate and overlapping the edges thereof at opposite sides of said opening and arranged for sliding engagement with the front face of the plate, guiding members secured to the front face of the body plate and having portions disposed forwardly thereof and engaging the front face of the shutter for supporting and guiding said shutter, supporting clips for the shutter secured thereto and overlying the front face of the forwardly disposed portions of the guide members and a plurality of spaced parts on the forwardly disposed portions of the guide members with which the clips are arranged to cooperate whereby to support the shutter in various adjusted positions along said opening.

CHARLES A. UPSON.